June 7, 1955 — L. T. GIBBS — 2,710,022
WEAR PLATES FOR VALVE CAGES
Filed Feb. 11, 1953
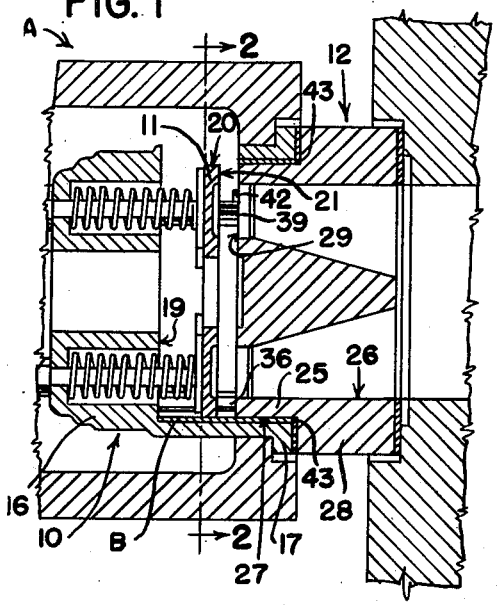
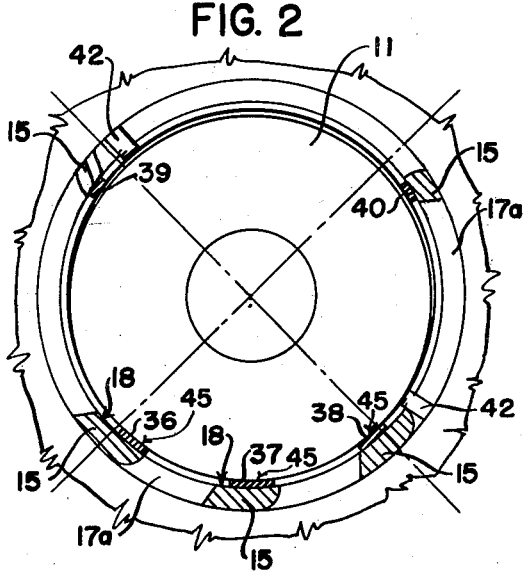
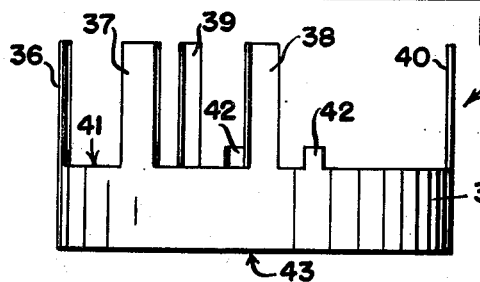
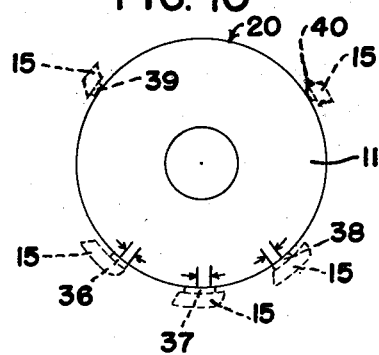
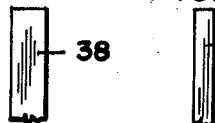
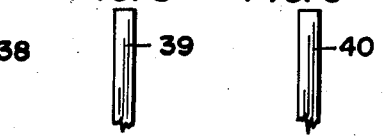
INVENTOR.
Lloyd T. Gibbs.
BY
Lancaster, Allwine & Rommel
Attorneys

2,710,022

WEAR PLATES FOR VALVE CAGES

Lloyd T. Gibbs, Tulsa, Okla.

Application February 11, 1953, Serial No. 336,273

2 Claims. (Cl. 137—529)

This invention relates to wear plates and the like, adapted to take the wear or rubbing of a moving body associated with a second body. Examples of such wear plates are those employed in association with reciprocating valve members, such as valve discs, and their cages, and this application is a continuation-in-part of application Serial No. 245,140 filed September 5, 1951. However, the present invention contemplates an additional function for the wear plates hereinafter disclosed.

An important object of the invention is to provide a readily detachable wear plate for association, for example, with a stationary valve cage of a reciprocating valve structure and constructed and arranged to take the wear or rubbing of the valve member, such as a valve disc.

Another important object of the invention is to provide a readily detachable wear plate, including a plurality of wear-receiving legs or members integral with a support member, and adapted for association, for example, with a stationary valve cage of a reciprocating valve structure and constructed and arranged to take the wear or rubbing of the valve member, such as a valve disc.

A further important object of the invention is to provide the wear-receiving legs or members previously described with valve member contacting surfaces only so wide as to be actually contacted by the valve member, irrespective of the width of the cage legs of the valve cage.

Additionally, an important object is to provide for a more effective flow of fluid between the periphery of a valve disc and the facing surfaces of the cage legs of a valve cage when the valve is open, than is generally possible when a wear plate or plates are associated as described.

Another important object is to provide for the flow of a greater volume of fluid between the periphery of a valve disc and the facing surfaces of the cage legs of a valve cage when the valve is open, than is generally possible when a wear plate or plates are associated as described.

Other objects and advantages of the invention will be apparent during the course of the following detailed description of the invention, taken in connection with the accompanying drawing, forming a part of this disclosure, and in which drawing:

Fig. 1 is a transverse section of a horizontally-disposed reciprocating valve structure with the valve open and the new wear plate, also shown in section, associated therewith.

Fig. 2 is a section, substantially on the line 2—2 of Fig. 1.

Fig. 3 is a flattened-out plan of the valve plate of Figs. 1 and 2.

Fig 4 is an elevation of the new valve plate, detached from a valve structure.

Figs. 5 to 9 inclusive are fragmentary elevational portions of the several legs of the wear plate.

Fig. 10 is a diagrammatic showing of the contact of the periphery of a valve disc with the wear-receiving surfaces of the wear plate.

In the drawing, wherein for the purpose of illustration is shown a preferred embodiment of the invention and wherein similar reference characters designate corresponding parts throughout the several views, the letter A designates a valve structure, and B the new wear plate.

The valve structure A may be substantially like that disclosed in my co-pending application Serial No. 245,140, filed September 5, 1951 and include a valve cage 10 for a reciprocating valve member 11 and a valve seat portion 12.

The valve cage 10 includes a plurality of spaced-apart legs 15 extending from a body portion 16 in substantial parallelism and joined by a ring providing outwardly-extending feet 17. These legs 15 are shaped and arranged substantially as shown and described in my co-pending application referred to above, except that two of the legs are narrower than the others, and there are spaced apart radially-extending passageways 17a between adjacent legs 15. It is from the inner faces or surfaces 18 that the legs of the wear plate extend, as will be more specifically detailed hereinafter. The body portion 16 has a substantially flat face 19 from which the legs 15 extend.

In the example shown, the valve member 11 is a disc having an outer periphery 20 and a valve seat-contacting face 21. The member 11 is, of course, less in diameter than the shortest distance across the valve cage and through the axial center thereof to the inner faces 18 of two opposite legs 15.

The valve seat portion 12 includes a hollow body 25 defining a fluid flow passageway 26 and having an outer periphery 27, a shoulder 28 extending outwardly from one end of the body 25 and a valve seat 29 at the other end of the body 25 and upon which the valve member 11 rests.

The new wear plate B may be economically constructed of a rectangular strip of suitable material, such as stainless steel, substantially $\frac{1}{16}$ inch in thickness. This strip is formed, in any approved way, such as by stamping, into a body or support portion 35 and a plurality of spaced-apart wear-receiving legs, such as the legs 36 to 40 inclusive, extending in substantial parallelism from one longitudinal edge 41 of the body portion 35, and there may be provided means to prevent rotation of the wear plate B when in use. These means may be lugs 42 extending from the edge 41. There is, of course, an edge 43 opposite and substantially paralleling the edge 41. The legs 36 to 40 inclusive are as long as the legs 15.

For use, the strip is formed, in any approved conventional way, with the body portion 35 tubular and the legs 36 to 40 inclusive extending therefrom to provide the wear plate B.

Considering the relative positions of the legs 15, the legs 36 to 40 inclusive are arranged for disposal with reference to the legs 15 substantially as in Fig. 2. That is, the legs 36, 37 and 38 occupy different positions, one with respect to another, on each associated leg 15, so that the ends of the legs 36, 37 and 38 are disposed from the longitudinal edges of the legs 15 distances differing as to each leg 15 occupied by a leg 36, 37 or 38. These positions are such that those portions of the periphery 20 of the valve member 11 which would be contacted by the surfaces 18 of the legs 15 are, instead, contacted by portions of the surfaces 45 of the legs 36, 37 and 38. Of course, the two other or more widely apart legs 15, faced by the legs 39 and 40 receive substantially no contact of adjacent portions of the periphery 20 and these legs 39 and 40 are provided mostly to and in preventing any undesired movements of the wear plate B. In Fig. 10 it will be seen that, in connection with the legs 36, 37 and 38 of a relatively unworn wear plate B, the initial contact surface of the periphery 20 is at portions only of the respective legs 36, 37 and 38. That is, adjacent the right-hand edge portions of legs 36 and 37 and adjacent the left-hand edge portion of leg 38. Of course, as the legs 36, 37 and 38 wear down these contact surfaces will shift, thus prolonging the life of the wear plate B.

The lugs 42 may be bent over into two of the passageways 17a to contact a longitudinal edge of two legs 15, substantially as in Fig. 2, thus preventing rotation of the wear plate B, but may be unbent in order to remove a worn wear plate.

From Fig. 1 it will be seen that shifting of the wear plate B along the longitudinal axis of the valve structure A is prevented because the edge 43 of the wear plate contacts any suitable part of the valve seat portion, such as a conventional gasket mounted upon the shoulder 28 and the outer edges of the free end portion of the legs 36 to 40 inclusive contact the face 19 of the valve cage when the parts are assembled as in Fig. 1.

Because of the contact of the periphery 20 of the valve member or disc 11 with portions of the legs 36, 37 and 38 and these portions project from the inner surfaces 18 of the legs 15, coupled with the smaller area of the two legs 15 contacted by the legs 39 and 40 there has been found a very desirable increase in the volume of fluid flow between this periphery and the legs 15, as compared with the volume of fluid flow which would ensue if the periphery contacted the surfaces 18 of the legs 15.

Various changes may be made to the form of the invention herein shown and described without departing from the spirit of the invention or scope of the claims.

What is claimed is:

1. A wear plate structure for the inwardly-facing surfaces of the spaced-apart legs of a valve cage inclined from the vertical and containing a reciprocating valve disc reciprocating in a path substantially paralleling and spaced from said legs, said structure including a body portion and a plurality of spaced-apart elongated legs extending therefrom in substantial parallelism along portions of said surfaces, each of said elongated legs being less in width than the width of any of said legs of said valve cage and the elongated legs which are uppermost, when said wear plate structure is within a valve cage, being less in width than the widths of the others of said elongated legs, and means removably securing said wear plate structure to a valve cage so that each of said others of said elongated legs will contact the surface of its associated leg of said cage at a location differing from that of any other of said others of said elongated legs, whereby all of said legs of said cage and wear plate structure when said structure is within said cage will provide a step construction.

2. A wear plate structure according to claim 1 characterized in that said body portion is tubular with substantially parallel edges and said elongated legs extend from one of said edges substantially paralleling the transverse axis of said body portion.

References Cited in the file of this patent

UNITED STATES PATENTS

| Number | Name | Date |
|---|---|---|
| 464,812 | Buckley | Dec. 8, 1891 |
| 500,848 | Bruel | July 4, 1893 |
| 1,193,975 | Beardsley | Aug. 8, 1916 |
| 1,367,826 | Myers | Feb. 8, 1921 |
| 1,376,744 | Conard | May 3, 1921 |
| 1,667,999 | Appleton | May 1, 1928 |
| 1,940,999 | Ferlin | Dec. 26, 1933 |
| 1,990,371 | Chadwick | Feb. 5, 1935 |
| 2,100,407 | Peo | Nov. 30, 1937 |
| 2,163,472 | Shimer | June 20, 1939 |
| 2,197,455 | Volpin | Apr. 16, 1940 |
| 2,289,556 | Stoyke | July 14, 1942 |
| 2,349,155 | Finley | May 16, 1944 |
| 2,465,005 | Bostic | Mar. 22, 1949 |
| 2,495,880 | Volpin | Jan. 31, 1950 |
| 2,590,686 | Coffey | Mar. 25, 1952 |
| 2,622,842 | Coffey | Dec. 23, 1952 |
| 2,649,277 | Blackford | Aug. 18, 1953 |